July 8, 1924.                                                              1,500,992
H. G. IRWIN
COTTON PICKER
Filed Sept. 1, 1920       4 Sheets-Sheet 3
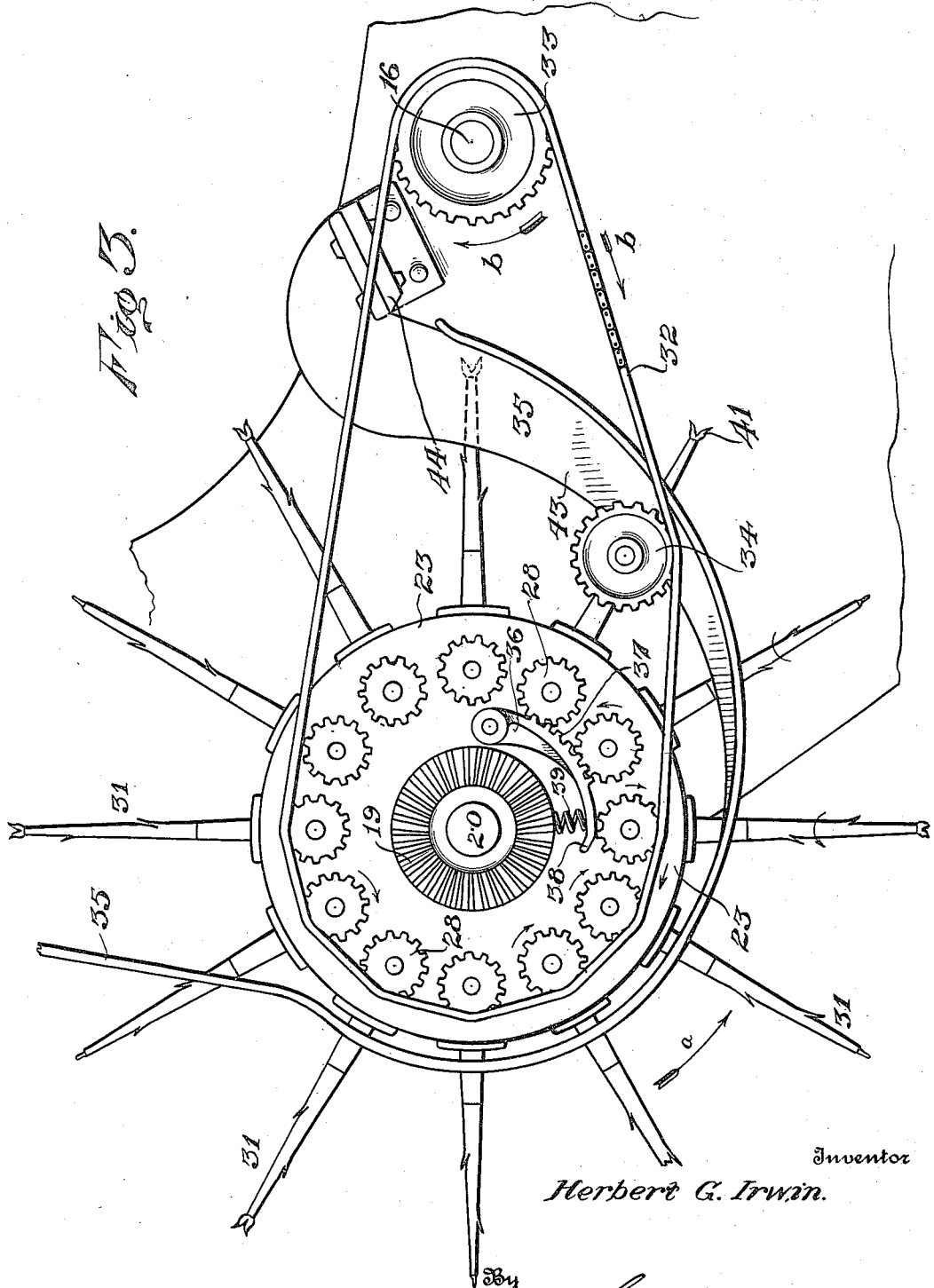
Inventor
Herbert G. Irwin.
By
Attorneys

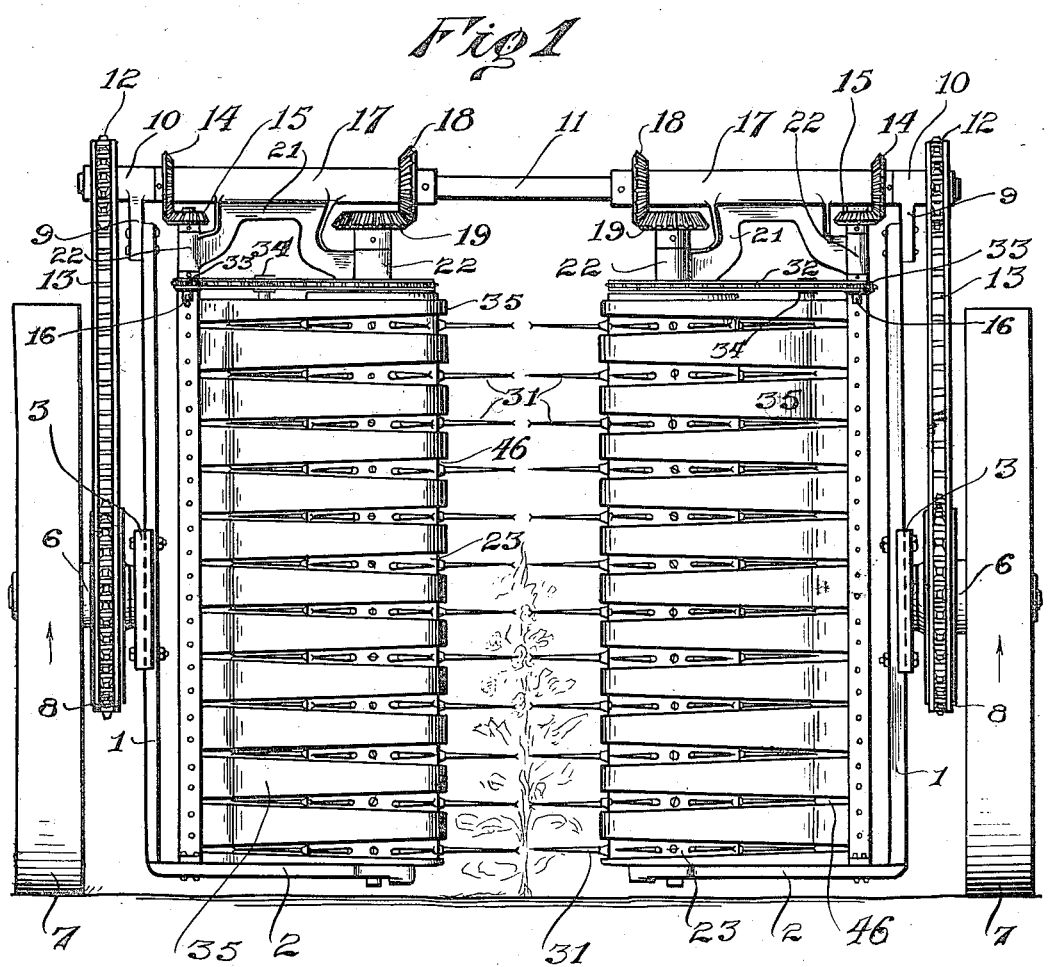

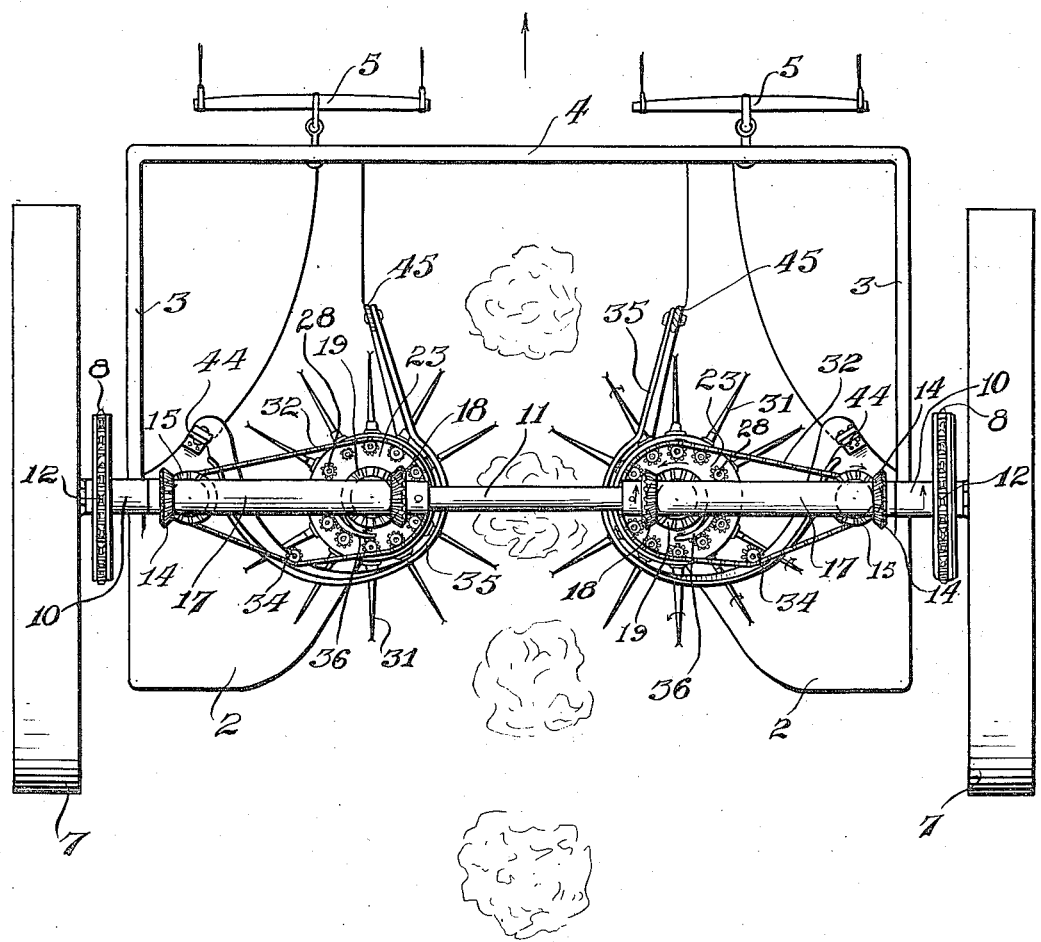

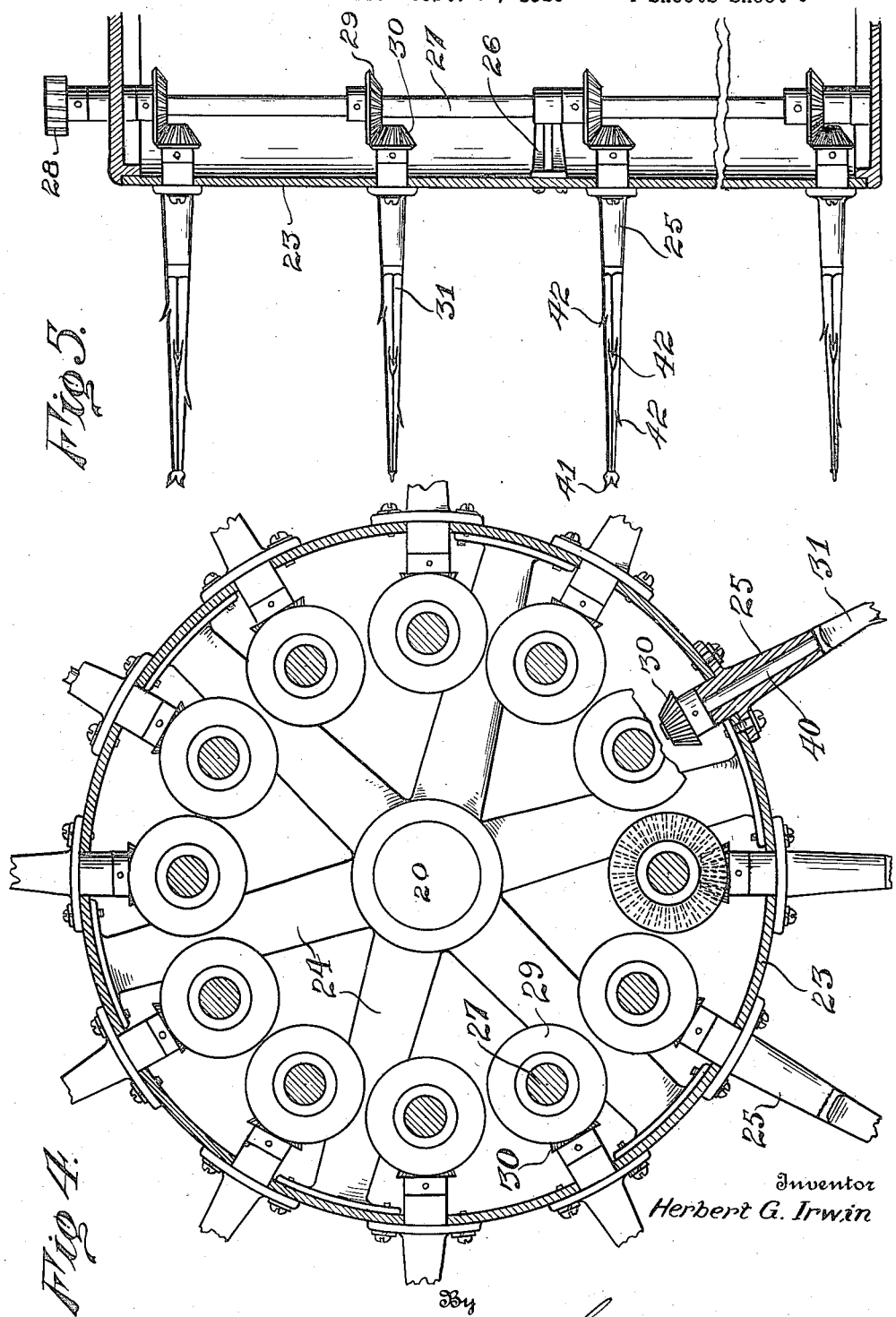

Patented July 8, 1924.

1,500,992

UNITED STATES PATENT OFFICE.

HERBERT G. IRWIN, OF FLOYDADA, TEXAS.

COTTON PICKER.

Application filed September 1, 1920. Serial No. 407,383.

*To all whom it may concern:*

Be it known that I, HERBERT G. IRWIN, a citizen of the United States, residing at Floydada, in the county of Floyd and State of Texas, have invented certain new and useful Improvements in Cotton Pickers, of which the following is a specification.

This invention seeks to provide efficient means whereby ripe cotton may be mechanically withdrawn from the burs on the plants continuously as the apparatus progresses along a row of standing plants. Secondary objects of the invention are to provide means whereby, as the machine is drawn along a row of plants, the plants will be successively engaged by a plurality of members which will work through the plants and extract the cotton; to provide means whereby the said cotton-extracting members will be caused to slightly loosen the extracted cotton after withdrawing from the plants; to provide means for stripping the cotton automatically from said extracting members, and to improve generally the construction and arrangement of the parts of a cotton picking machine to the end that the cost of manufacture may be minimized, the life of the machine prolonged and the operation thereof simplified. These several stated objects and such other objects as will incidentally appear in the course of the following description are attained in such a machine as is illustrated in the accompanying drawings, and the invention resides in certain novel features which will be particularly pointed out in the claims following the description.

In the accompanying drawings—

Figure 1 is a rear elevation of a cotton picking machine embodying my improvements;

Fig. 2 is a plan view of the same;

Fig. 3 is an enlarged plan view of the cotton picking members with the cylinder by which they are carried into and withdrawn from the plant and the scraper whereby the cotton is removed from the cotton-extracting members;

Fig. 4 is an enlarged horizontal section through the cylinder which carries the cotton-extracting members;

Fig. 5 is a detail vertical section of the same.

In carrying out my invention, I employ a frame which may be of any desired construction and is illustrated as consisting of standards 1 carrying tables or platforms 2 at their lower ends, and side bars 3 secured to intermediate points of the height of said standards. The side bars 3 extend forwardly and are connected by a front cross bar 4 to which draft devices 5 are attached as will be readily understood. The front ends of the tables or platforms 2 are also suspended in any convenient manner from the said front cross bar. At the rear ends of the side bars 3 and preferably at the junction of the same with the standards 1, I provide thereon axles or spindles upon which are mounted the hubs 6 of ground wheels 7 and upon the inner end of each hub 6 I rigidly secure a sprocket wheel 8. The wheels 7 obviously serve as traveling supports for the frame and inasmuch as the sprocket wheels 8 are fixed to the hubs of the ground wheels they will rotate with the latter and hence constitute prime movers to operate the working members of the apparatus.

To the upper end of each standard 1, I secure rigidly a bracket 9 having a bearing sleeve 10 at its upper end and in the said sleeves 10 I mount the driving shaft 11 which is equipped at both ends with sprockets 12. Chains 13 are trained around the said sprockets 12 and the driving sprockets 8 so that the motion of the ground wheels will be transmitted directly to the shaft 11. The sprockets 12 are held against outward movement upon the shaft 11 in any desired manner and at the inner side of each bearing 10, I secure to the shaft 11 a beveled gear 14 which meshes with a beveled pinion 15 on the upper end of a vertically disposed shaft 16 for a purpose which will be presently stated. A relatively long bearing sleeve 17 is fitted about the shaft 11 at the inner side of the gear 14 and at the inner end of the sleeve 17 a similar beveled gear 18 is secured to the shaft, the said gear 18, however, being disposed oppositely to the gear 14, as clearly shown. The gear 18 meshes with a beveled gear 19 secured rigidly upon the upper end of the cylinder-driving shaft 20. The sleeve 17 is rigid with and is preferably formed integral with a bracket 21 having vertically disposed bearing sleeves 22 at its opposite sides to receive the shafts 16 and 20, the shaft 16 being carried by its respective sleeve, as shown in Fig. 1, and the lower end of the shaft 20 being journaled in the platform or floor 2, in any convenient manner. The shaft 20 constitutes the axis of a cylinder 23 which is supported from the shaft by a plurality of spokes or radially disposed arms 24 which may be of any desired form, as will be readily understood. In the vertical circumferential wall of the cylinder 23, I provide a plurality of vertical series of openings through which the picker arms project and to the outer surface of said wall I secure bearing sleeves 25 in each of which one of the picker arms is journaled. On the inner surface of the circumferential wall of the cylinder, I secure, adjacent each vertical series of openings, inwardly projecting brackets 26 in each vertical series of which a shaft 27 is journaled, said shaft being supported at its lower end in a step bearing upon the bottom of the cylinder and having its upper end extending through the top of the cylinder and equipped with a spur gear or sprocket 28. At intervals upon the shaft 27 corresponding to the intervals between the bearings 25 and the openings alined therewith, I secure beveled pinions 29 each of which meshes with a beveled pinion 30 on the inner end of a picker 31 journaled in and extending through the adjacent bearing sleeve 25. A flexible driving element, such as a sprocket chain 32, is trained around the sprocket 33 which is secured to the shaft 16 immediately above the horizontal plane of the top of the cylinder 23 and the said chain 32 also extends over the top of the cylinder and is disposed to engage those gears or sprockets 28 which may be within the bight of the chain, as will be readily understood upon reference to Fig. 3. An idler sprocket 34 is carried by the uppermost scraper 35 in position to engage the said chain 32 and thereby maintain the tension of the chain and compensate for wear. Pivoted to the bracket 21 and disposed within the horizontal plane of the gears or sprockets 28 is a segment 36 which has its free end disposed toward the inner side of the mechanism and is provided upon its outer convex face with a rack 37 which is adapted to be successively engaged by the several gears 28 as will be readily understood. The free extremity of the segment is turned inwardly, as shown at 38, so that it will not be apt to abruptly engage an advancing gear and strip the teeth of the same. The segment is projected outwardly about its pivot, so as to maintain the engagement of the rack 37 with the gears 28, by a spring 39 disposed between the free end of the segment and the side of the bracket 21 as will be readily understood.

Each picker 31 is provided at its inner end with a portion 40 of circular cross section which extends through the bearing sleeve 25 so that the picker may rotate easily in said sleeve and the beveled gear 30 is secured to the inner extremity of this portion 40, as shown most clearly in Fig. 4. The outer portion of the picker is preferably of angular cross sectional form and at its extremity is constructed with diverging spurs 41 adapted to take into the cotton upon the plant. At intervals between the outer free extremity of the picker and the bearing sleeve 25 other spurs or teeth 42 project from its surface and it will be readily understood that if the picker be inserted in a plant and rotated, these several points, spurs or teeth will engage the cotton and will roll the same about the picker so that it will be withdrawn from the bur. The angular cross section of the pickers provides corners which assist in rolling the cotton tightly about the picker arm and pulling the cotton from the bur, and the picker arms taper toward their outer ends to facilitate the stripping of the cotton therefrom.

Above the uppermost annular series of pickers, below the lowermost series of pickers and between the successive series of pickers throughout the height of the cylinder or gang of pickers, I provide the strippers 35 which, as shown most clearly in Fig. 3, extend around the inner portions of the cylinders and are of eccentric form so that as each series of pickers is carried into and out of the plant by the rotation of the cylinder 23 the pickers will successively be withdrawn across the edges of the strippers and the cotton thereby scraped from the pickers. By reference to Figs. 1 and 3, it will be readily understood that the scrapers are substantially arcuate plates set on edge and reinforced at their working ends by ribs 43 extending outwardly and forwardly beyond the extremities of the working portion of the scrapers and secured to an upright bar 44 which is carried by the platform or floor 2. In order to reinforce the scraper, it is provided with an extension in advance of the cylinder which is secured to an upright 45 rising from the forwardly extending portion of the platform, as shown clearly in Fig. 2. By referring to Fig. 1, it will also be noted that the upper and lower edges of the scraper are inclined or out of parallelism whereby the space between adjacent scrapers, indicated at 46, is contracted as it approaches the outer extremities of the scrapers and the bar or upright 44 so that while the pickers may recede through the said space the cotton which has been wrapped upon the picker will be brought against the converging opposed edges of the adjacent scrapers and thereby stripped from the picker.

The construction and arrangement of the several parts of my improved machine having been thus made known, it is thought the operation of the same will be readily understood. The machine is drawn over a field along a row of plants by draft animals or a tractor as may be preferred with the row of plants disposed between the cylinders 23. As the machine progresses, the ground wheels will impart motion to the driving shaft 11 through the sprocket gearing shown and described. The gears 15 and 19 will thus be caused to rotate in opposite directions so that the cylinders 23 will be caused to rotate toward the rear of the machine at their adjacent opposed surfaces and the pickers thereby successively carried into and through the plants without combing the same. As shown in Fig. 3, the cylinder will rotate in the direction of the arrow $a$, while the sprocket 33 and chain 32 will be caused to rotate in the direction indicated by the arrows $b$. The rotation of the cylinder will carry the pickers successively into and through the plants and then past the scrapers, and the gears 28 will also be carried successively into the bight of the chain 32 by the rotation of the cylinder, and the engagement of these gears with the chain will cause them to rotate in the direction indicated by the adjacent arrows in Fig. 3. The vertical shafts 27 will thus be caused to rotate inasmuch as the gears 28 are each secured to the upper end of one of said shafts, and the motion of the shaft will be transmitted through the gears 29 and 30 to rotate the pickers about their own longitudinal axes. The several points, spurs, or teeth 41 and 42 will thus be caused to actively engage the cotton and wrap it about the respective pickers so that it will be positively and cleanly withdrawn from the burs. As the rotation of the cylinder 23 continues, the pickers will obviously be withdrawn from the plant and the gears 28 will also be successively carried into engagement with the rack 37 which will impart a reverse rotation thereto, as will be obvious upon reference to Fig. 3 and consequently cause the pickers to reverse their rotation and slightly loosen or unroll the cotton so that as the picker with the cotton thereon moves across the edges of the adjacent scrapers the cotton will be scraped easily and cleanly from the picker, falling onto the platform or floor 2 whence it may be gathered in any convenient manner.

It will be readily noted that the pickers are arranged in annular series disposed in horizontal planes and also in vertical series or columns so that they are co-extensive with the vertical circumferential surface of the cylinder carrying them. The bushes are, consequently, engaged by the pickers throughout their height and as long as a cylinder is within working distance of a bush, there will be some pickers in engagement with the bush. It will also be noted that the ends of the scrapers are spaced apart and are radially beyond the arcs described by the free ends of the pickers, while the intermediate portions of the scrapers encircle the greater portion of the circumference of the cylinder and are eccentric thereto, being close to the surface of the cylinder at the front thereof and following an arc gradually and continuously moving away from the cylinder at the inner side and the rear and the outer side of the same and terminating at a point removed from the cylinder a greater distance than the length of the pickers. As a result of this arrangement, the full length of the cotton-wrapped pickers will be acted upon by the scrapers and the scraping or removing action will be effected longitudinally of the picker arm from the inner butt end thereof toward and over the free outer end thereof.

From the foregoing description, taken in connection with the accompanying drawings, it is thought to be clear that I have provided an exceedingly simple, compact and efficient machine by the use of which cotton may be rapidly and fully picked from the plants so that the gathering of the crop will be expedited and the labor incident to the work minimized. Inasmuch as the cotton upon the plant is directly engaged by the extracting members, the loss of cotton through a failure of the same to be held against the action of the wind is minimized, and inasmuch as the mechanism which acts directly upon the pickers is enclosed by the cylinder carrying the pickers, the access of cotton thereto with consequent clogging of the same is prevented.

It is to be understood that I do not restrict myself to the exact form and arrangement of gearing herein specifically shown and described, and that various changes may be made in the minor details without departing from the spirit or scope of the invention as the same is defined in the following claims.

Having thus described my invention, what is claimed as new is:

1. In a cotton-picking machine, the combination of a cylinder, a plurality of pickers carried by the cylinder and constantly radial thereto, means for rotating the cylinder about a vertical axis whereby to carry the pickers into and out of engagement with a plant, and scrapers fixed above and below the pickers, the ends of the scrapers being disposed in advance of and outwardly beyond the cylinder respectively and radially beyond the arcs described by the free ends of the pickers, and the intermediate portions of the scrapers extending from a point close to the cylinder eccentrically around the cylinder in rear of the same to a point removed therefrom a distance greater than the length of the pickers.

2. In a cotton-picking machine, the combination of a vertically disposed cylinder, a plurality of pickers extending from the cylinder constantly on radii thereof and mounted for rotation about their own axes in the wall of the cylinder, said pickers being disposed in vertical series, a plurality of shafts mounted vertically in the cylinder and each adjacent and geared to one vertical series of pickers, gears on the upper ends of said shafts in fixed relation to the cylinder, a relatively stationary rack disposed above the cylinder in the horizontal plane of said gears at the inner side of the path traveled by them, means for rotating the cylinder, means engaging the said gears and acting thereon at the outer side of the path traveled by them, said means being positively caused to travel in opposition to the direction of rotation of the cylinder, the rotation of the cylinder causing the gears to successively engage said last-mentioned means and the rack whereby the pickers will be positively rotated in opposite directions during successive periods in the rotation of the cylinder.

3. In a cotton-picking machine, the combination of a circular series of picker arms, means for turning said series of picker arms about its center to carry the several arms successively into and out of engagement with a plant, the picker arms being contantly radial, means for rotating the several arms about their own axes to wind the cotton thereon as they travel around the center of the series of arms, stationary scrapers arranged above and below the picker arms and eccentric thereto whereby the picker arms will pass between adjacent scrapers as they turn about the center of the series of arms, the opposed edges of the scrapers converging toward their outer terminals, and means for reversing the rotation of the picker arms as they pass from between the scrapers.

4. In a cotton-picking machine, the combination of a frame, a driving shaft mounted thereon, a cylinder supported vertically on the frame below the driving shaft and having its axis geared to said driving shaft, series of constantly radial pickers carried by the cylinder, a plurality of vertical shafts carried by and within the cylinder adjacent the circumferential wall of the same and each geared to a series of pickers, the upper ends of said shafts extending through the top of the cylinder, gears on the upper ends of said shafts, a vertical shaft mounted below the driving shaft at one side of the cylinder and geared to the driving shaft to rotate in the opposite direction to the rotation of the cylinder, a sprocket on said last-mentioned shaft, and a chain trained around said sprocket, there being always operative engagement between said chain and the gears on some of the shafts carried by the cylinder.

5. In a cotton-picking machine, the combination of a vertical cylinder, pickers carried by the cylinder, and constantly radial thereto, means for rotating the cylinder whereby to carry pickers into and out of a cotton plant, vertical shafts disposed within the cylinder in a circular series about the axis of the same and each geared to a series of pickers, gears on the upper ends of said shafts, a flexible driving element arranged across the top of the cylinder and having its bight engaged by some of said gears, a rack pivotally mounted at one end to be engaged by each gear as it leaves the bight of the flexible driving element, yieldable means for holding the rack to the gear, and means for actuating the flexible driving element in a direction reverse to the direction of rotation of the cylinder.

6. In a cotton-picking machine, the combination of a supporting frame, a cylinder mounted vertically on the frame, pickers carried thereby in vertical and horizontal series and constantly radial thereto, means for rotating the cylinder, and a vertical series of scrapers each secured at one end to the frame in advance of the cylinder and extending past and in rear of the cylinder and disposed eccentric to the cylinder at the rear thereof, the outer ends of the scrapers being secured to the frame laterally beyond the cylinder and the pickers operating in the spaces between the scrapers whereby cotton will be removed from the pickers at the rear and laterally beyond the cylinder.

7. The combination of a supporting frame, a vertically disposed cylinder mounted on the frame, a driving shaft mounted transversely on the frame above the cylinder, means for rotating the driving shaft, gearing connecting the driving shaft with the cylinder whereby to rotate the cylinder about its own axis, series of picker arms mounted in the cylinder and projecting radially therefrom, shafts mounted vertically in the cylinder and each geared to a series of picker arms whereby upon rotation of said shafts the arms will be rotated about their own axes, gears on the upper ends of said shafts above the upper end of the cylinder, a vertically disposed shaft supported at one side of the cylinder and geared to the driving shaft to rotate in a direction reverse to the direction of rotation of the cylinder, and means for transmitting motion from the vertically disposed shaft outside the cylinder to the gears on said vertical shafts mounted within the cylinder.

8. The combination of a supporting frame, a vertical cylinder mounted thereon, means for rotating said cylinder, a plurality of picker arms carried by and projecting radially from the cylinder, means for rotating said arms about their own axes during the rotation of the cylinder, and a plurality of stripper plates each secured at one end to the frame in advance of the cylinder and at the opposite end to the frame laterally beyond the cylinder, the intermediate portions of the stripper plates being disposed close to the cylinder and passing in rear of the same and between the respective picker arms.

In testimony whereof I affix my signature.

HERBERT G. IRWIN. [L. S.]